May 3, 1960 W. H. DU SHANE ET AL 2,935,145
HITCH DEVICE
Filed July 11, 1955 3 Sheets-Sheet 1

INVENTORS.
WALLACE H. DU SHANE
HAROLD K. KIENZLE
BY
C. T. Parker & R. C. Johnson
ATTORNEYS May 3, 1960
W. H. DU SHANE ET AL
2,935,145
HITCH DEVICE
Filed July 11, 1955
3 Sheets-Sheet 2
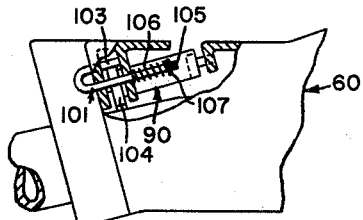
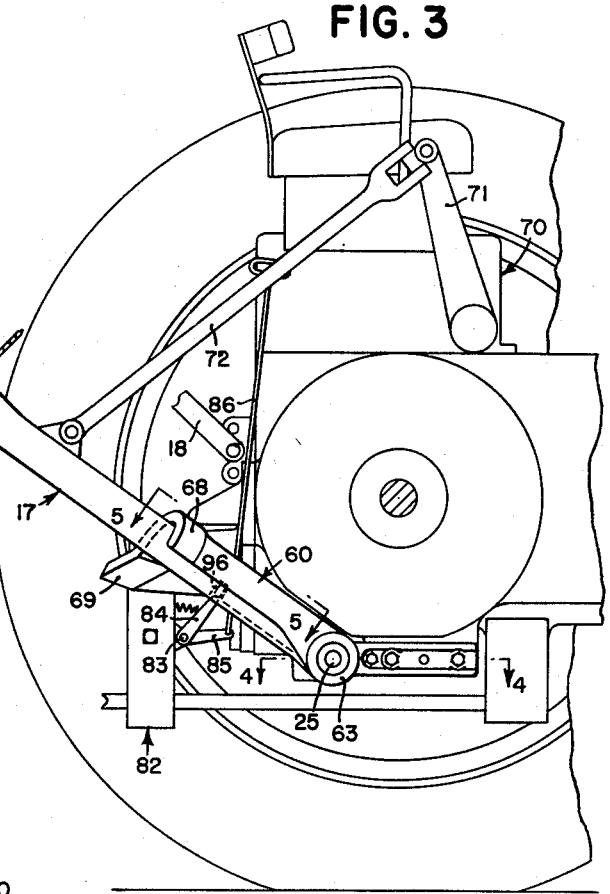
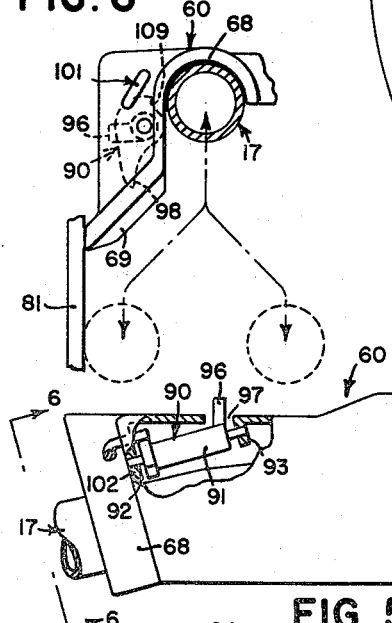
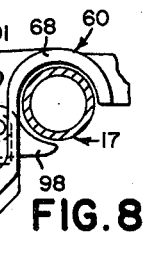
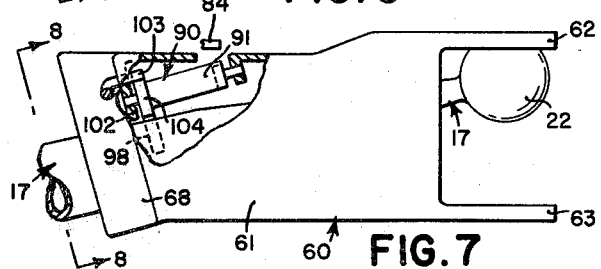
INVENTORS.
WALLACE H. DU SHANE
HAROLD K. KIENZLE
BY
ATTORNEYS

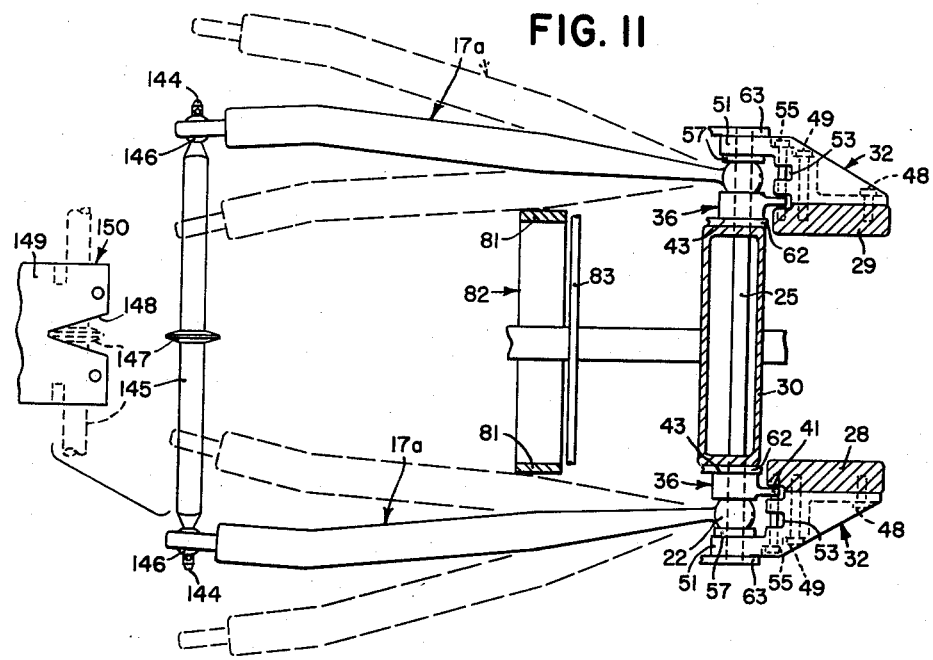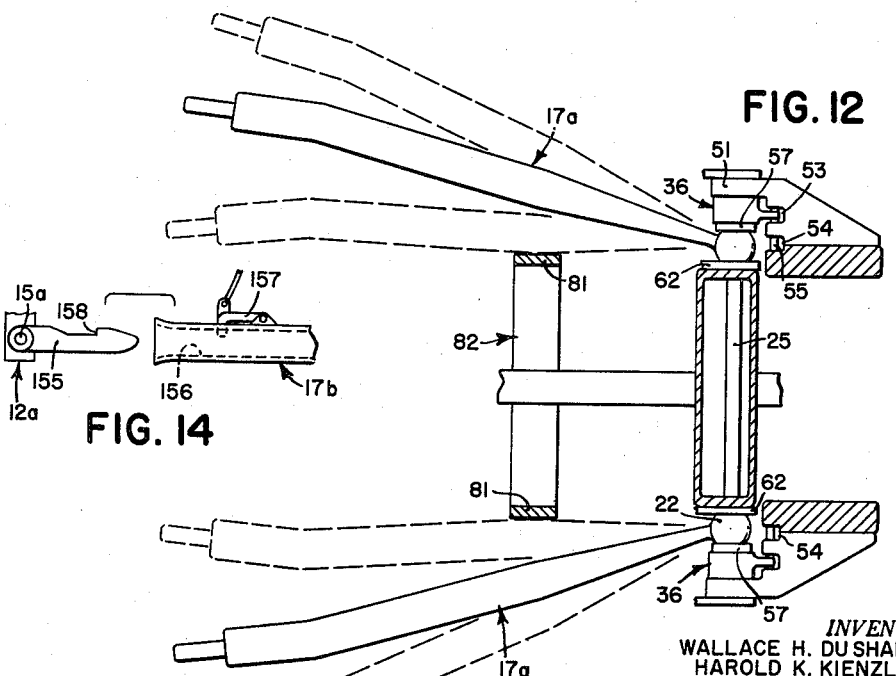

United States Patent Office 2,935,145
Patented May 3, 1960

2,935,145

HITCH DEVICE

Wallace H. Du Shane and Harold K. Kienzle, Waterloo, Iowa, assignors, by mesne assignments, to Deere & Company, a corporation of Delaware Application July 11, 1955, Serial No. 521,046

19 Claims. (Cl. 172—275)

The present invention relates generally to agricultural implements and more particularly to tractor carried hitch linkages and the like for connecting an implement to a tractor.

The object and general purpose of the present invention is the provision of a hitch linkage that is particularly constructed and arranged so as to accommodate implements having different hitch points. More particularly, it is a feature of this invention to provide a tractor carried hitch linkage constructed and arranged to accommodate implements having different lateral spacing between the attaching points on the implement.

A further feature of this invention is the provision of new and improved hitch linkage control mechanism for controlling the lateral movement of the hitch linkage, either in the raised position or the lowered position, or both, all under the control of the tractor operator. More specifically, it is a feature of this invention to provide sway control mechanism that is particularly constructed and arranged to provide for different lateral positions of the hitch linkage, such as may be necessary to accommodate different lateral spacings between the attaching points of the implement.

A still further feature of this invention is the provision of means providing for the ready and automatic connection of the hitch linkage with an implement when the sway control mechanism operates to limit or prevent lateral movement of the hitch linkage relative to the tractor, whereby backing the tractor into the implement and connecting the latter to the tractor is materially facilitated.

Other objects and advantages of the present invention will be apparent to those skilled in the art after a consideration of the following detailed description, taken in conjunction with the accompanying drawings, in which:

Fig. 1 is a side view of the rear portion of a farm tractor equipped with hitch linkage and sway control means in which the principles of the present invention have been incorporated, the hitch linkage and sway control mechanism being arranged in a position in which lateral swinging of the hitch links is prevented, thereby facilitating backing the tractor into the implement to connect the latter with the draft links.

Fig. 3 is a view similar to Fig. 1, showing the implement in its raised position, in which the draft control mechanism operates to prevent lateral swinging of the draft links, thus holding the implement against lateral shifting movement in its raised position.

Fig. 5 is an enlarged fragmentary plan view, corresponding generally to a view taken along the line 5—5 of Fig. 3, showing the sway control arm means and associated latch means in the position in which the latter acts to maintain the sway control arm means in an elevated position, thereby providing for sway prevention only in the raised position of the draft links and associated implement.

Fig. 6 is a sectional view taken generally along the line 6—6 of Fig. 5, being principally a rear end view of one of the sway control arms.

Figure 1:
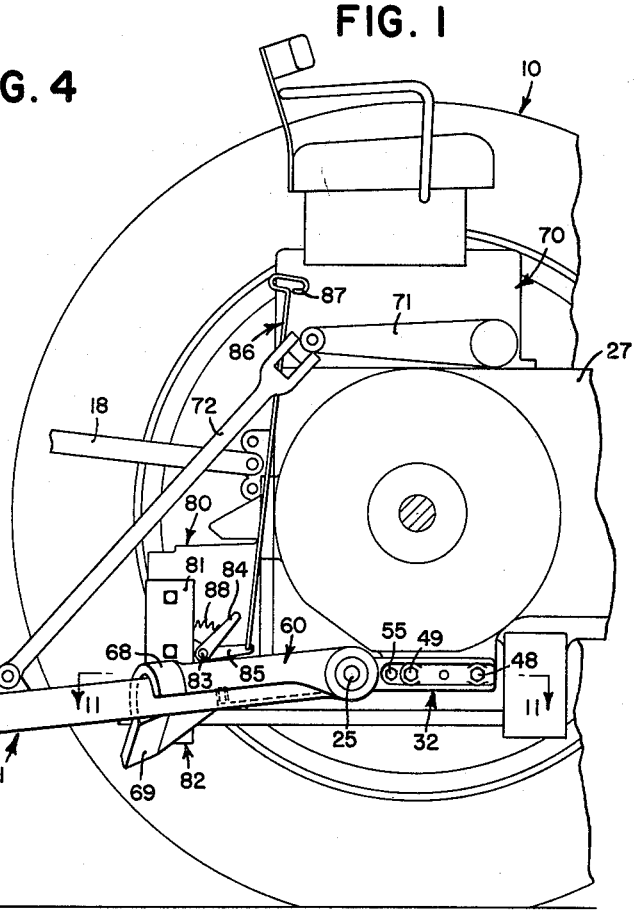

Fig. 7 is a view similar to Fig. 5, showing the latch means associated with the sway control arm in the position in which the latch means is disengaged from the tractor, whereby the sway control arm may move freely between upper and lower positions, in which case the hitch links are held against lateral swinging movement at all times, both when the implement is in an operating position and when it is in a raised position, the sway control arm being freely movable between the position shown in Fig. 1 and the position shown in Fig. 3.

Fig. 8 is a view taken along the line 8—8 of Fig. 7.

Fig. 9 is a view similar to Figs. 5 and 7, showing the locking means for the sway control arm latch.

Figure 10:
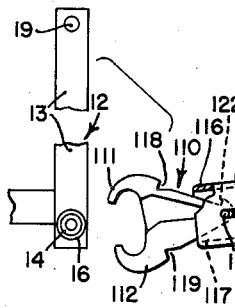

Fig. 10 is a detail view of one of the draft link spacers or abutment members.

Fig. 11 is a view taken generally along the line 11—11 of Fig. 1, showing the sway control arm spacers arranged to dispose the hitch or draft links to receive implements having relatively closely spaced hitch points.

Fig. 12 is similar to Fig. 11, showing the spacers in another position.

Figure 4:
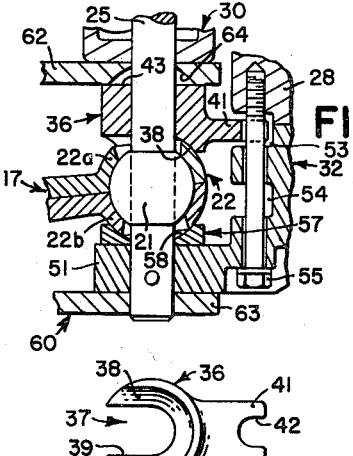
Fig. 4 is an enlarged sectional view, taken along the line 4—4 of Fig. 3, showing the coaxial pivotal mounting of each draft link and the associated sway control arm on the pivot means mounting these parts on the side of the tractor body.
Figure 13:
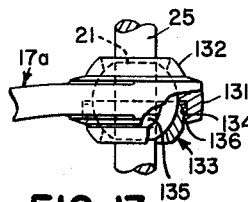

Fig. 13 is a view similar to Fig. 4, showing a modified form of ball connector for the forward end of a draft or hitch link.

Fig. 14 is a fragmentary view showing a modified form of quick attachable link-implement connection.

Referring first to Fig. 1 the reference numeral 10 indicates a farm tractor which, being generally of conventional construction, only the rear portion is shown. The tractor 10 is equipped with a three point hitch linkage structure 11 by which an agricultural implement 12 may be connected with the tractor. Since the implement 12 may be of any suitable construction, the same is shown only fragmentarily in Fig. 1, the implement incorporating frame means 13 to which at the front portion a pair of laterally outwardly extending connectors 14 are attached. Preferably, the connectors 14 are formed by the end portions of an implement carried transverse bar that is mounted in the forward portion of the implement frame 13, and the ends 14 of the bar are reduced and carry ball members 16.

The principal means connecting the implement 12 with the tractor 10 includes right and left hand lower draft links 17 and an upper or thrust link 18. The latter is pivotally connected at its front end with the tractor 10 and at its rear end is adapted to be connected with an upper and forward portion 19 of the implement frame 13. At their forward ends, as best shown in Fig. 4, each of the draft links 17 is provided with an interior ball 21 held in a generally spherical socket section 22. Preferably, the socket section 22 is formed at the front end of the associated draft link 17 by two ball-embracing parts 22a and 22b, the sides of which project laterally outwardly so as to receive associated abutment members, each having a spherical seat, as will be described below. The socket section 22 and the ball 21 are suitably apertured to provide for the reception of a pivot means in the form of a cross shaft 25 that is carried by the tractor in any suitable way and projects laterally outwardly from opposite sides of the tractor body, the latter being indicated by the reference numeral 27 and depending portions of which underneath the rear axle being indicated generally at 28, 29, and 30 in Fig. 11. Cooperating with the laterally outwardly extending portions of the shaft 25 are right and left hand castings 32 that receive the ends of the shaft 25, thus providing pivot means for receiving the forward ends of the draft links 17.

According to one feature of the present invention, and as illustrated in Figs. 11 and 12, the draft links 17 are adapted to have their forward ends connected to the aforesaid pivot means of the tractor in either of two positions, one with the forward end 22 of each link disposed adjacent the tractor body, the other position being with the forward end 22 of the draft link disposed a predetermined distance away from the tractor body. This arrangement has been adopted to provide for receiving two kinds or sizes of implements, one having the link-receiving elements 14 spaced apart laterally a given distance and the other having the link-receiving means 14 spaced apart laterally a different distance.

Means is provided for holding the forward ends of the draft links 17 in the desired position on the ends of shaft 25. This means includes a pair of draft link spacer blocks or abutment members, each indicated by the reference numeral 36. As will best be seen from Fig. 10, each of these spacer blocks 36 includes a socket end 37 having a generally spherical recess 38 and slotted, as at 39, to provide for application of the spacer 36 to or removal from the shaft end in a transverse direction. The member 36 also includes a bifurcated extension 41 having a notch 42. The face of the main section 37 of the spacer 36 opposite the spherical recess 38 is planar as indicated at 43. Each of the pivot members 32 is secured to the associated tractor body section 28 or 29, by attaching bolts 48 and 49, and each member 32 is provided with a rearwardly directed section 51. The extension 51 of each pivot member 32 is apertured to receive the end of the shaft 25, and each pivot member 32 is provided with a pair of notches 53 and 54 in either of which the lug 41 of the associated spacer block 36 may be disposed, according to the desired position of the block 36. The pivot member 32 is apertured through the notched section to provide for a retaining bolt 55, which bolt extends through the notch 42 in the associated lug portion 41 on the block or abutment 36, whereby the latter is held in position. Associated with and forming a companion part relative to each spacer block 36 is a washer or abutment member 57 apertured to receive the shaft end and provided with a spherical seat 58 that, like the socket or spherical seat 38, receives the forward portion of the draft link 17. As will best be seen in Fig. 4, the spherical socket sections 38 and 58 directly engage the spherical portions of the link end 22, rather than the ball 21, whereby the link 17 makes a direct connection with the tractor-carried parts and the ball 21 is thus relieved of any laterally directed forces.

A pair of sway control arms 60 are carried by the tractor for cooperation with the links 17. The sway control arms are pivotally mounted on the tractor for movement relative thereto about the same axis about which the draft links 17 move when the links swing vertically. To this end, each of the sway arms 60 comprises a main body section 61 having at its forward end a pair of laterally spaced apart extensions 62 and 63 that are apertured to receive the end of the shaft 25. Each of the extensions 62, which lie immediately adjacent the depending portion 30 of the tractor body, is provided with a spherical socket 64 adapted to receive the ball end of the link 17 when the forward end of the link is disposed closely adjacent the sides of the tractor, as shown in Fig. 12. In order to hold the ball ends of the link 17 closely adjacent the sides of the tractor, the spacer blocks 36, are, as shown in Fig. 12, disposed on the shaft 25 with the socket section 38 immediately adjacent and in contact with the laterally inner side of the section 51 of the pivot member 52. This disposes the spacer extension 41 in the laterally outer notch or recess 53, and when arranged in this way, the washer 57 is disposed between the spacer 36 and the ball end 22 of the associated draft link 17.

Arranged in the manner just mentioned, the draft links 17 are adapted to receive the wider implements, as will be apparent from Fig. 12. However, when it is desired to connect to the more narrow implements, the draft links 17 are arranged with the ball ends 22 adjacent the laterally outer portions of the pivot member 32 and away from the sides of the tractor. In order to arrange the links in this way, the bolt or studs 55 are removed, which permits the extension 41 on each of the spacers 36 to drop down, and then each spacer may be removed from the shaft 25 by a downward movement. The ball ends 22 are then swung to their laterally outer positions, each seating in the socket 58 of the washer 57 which is disposed against the adjacent face of the pivot member extension 51. The spacer 36 is then reinserted over the shaft 25, being placed between the ball end 22 of the link and the inner extensions 62 of the sway control arm. The extension 41 of the spacer 36 is then swung upwardly and to a forwardly extending position and the holding bolt or stud 55 reinserted. The inner end of each of the studs or bolts 55 is threaded and can be screwed into a tapped aperture in the tractor body, as will be clear from Fig. 11.

By virtue of the apertured extensions 62 and 63, both of which are directly pivoted onto the shaft 25, as best seen in Fig. 4, the sway control arm 60 at each side of the tractor is hingedly connected with the latter so as to be capable of being swung vertically about the axis defined by the shaft 25, but the sway control arm is prevented from lateral movement. The draft links 17 are, of course, capable of lateral swinging relative to the tractor by virtue of the seating of the ball member 21 within the socket portion 22 at the front end of each draft link. In order to perform its function of controlling the lateral movement of the draft link, each sway control arm 60 is formed at its main body portion 61 generally as a half cylindrical section 68, Fig. 6, the laterally inner wall portion of which is provided with a downwardly and laterally inwardly flaring guide portion 69. The half cylindrical portion 68 forms a socket in which to receive the adjacent part of the associated draft link 17. These parts fit with sufficient looseness so that the rear end of the sway control arm 60, when engaging the draft link 17, serves the purpose not only of holding the draft link 17 against displacement, cooperating with the spacer block 36, but, in addition, when the spacer block 36 is removed, the rear end of the sway control arm 60 acts as a fulcrum for the link 17 when the front or ball end of the link is shifted from one side to the other preceding the reinsertion of the spacer 36.

The hitch links 17 are adapted to be raised and lowered by the power lift unit 70 of the tractor, the latter including a pair of lift arms 71 to which the lift links 72 are connected at their upper ends, the lower ends of the lift links 72 being pivotally connected with the draft links 17. This is conventional so far as the present invention is concerned and hence further description is unnecessary. The power lift unit 70 includes suitable valve means (not shown) by which the unit is placed under the control of the operator of the tractor.

When the rear or link engaging section 68 of each control arm engages the associated hitch link 17, the links 17 and the associated implement 12 are held against lateral swinging relative to the tractor. This is the position indicated in Figs. 1 and 3, the latter figure showing the implement in a raised or transport position. In some cases it may be desirable to free the links 17 for lateral swinging relative to the tractor, and to this end, means is provided for retaining the sway control arms 60 in a raised position so that the links 17 and implement 12 are held against lateral swinging only in the upper or transport position. This is a very desirable function of the present invention, that is, holding the implement and links against lateral swinging when in transport position, irrespective of the desired movement of the implement and links relative to the tractor in the operating position, for implements may frequently be transported at fairly high speeds, and it is desirable to prevent the implement from swinging from one side to the other even at low transport speeds, but especially at higher speeds, so as to prevent the links and/or any part of the implement from swinging into one of the tractor rear wheels, and also to prevent the tractor from becoming unstable laterally. The latch means that holds the sway control arm 60 in their raised position (Fig. 3) will now be described.

The laterally inner portions of the sway control arms 60 contact upwardly extending portions 81 of a drawbar support 82 that forms a part of the tractor, the drawbar support being fixed in any suitable way to the power shaft housing 80 (Fig. 1) of the tractor or other accessible part. The power shaft housing also supports a cross shaft 83 (Fig. 11), each end of which carries an arm 84. The shaft 83 also carries an arm 85 that lies inwardly of one of the arms 84 and receives an operating member 86 in the form of a vertically disposed rod connected at its lower end with the arm 85 and having a handle section 87 at its upper end accessible to the operator seated on the tractor. Thus, both sway control arms are released at the same time by a pull on the handle 87. A spring 88, or other suitable means, acts to hold the arms 84 in a given position, there being suitable stop means (not shown) that acts to prevent movement of the arms 84 forwardly or downwardly beyond the position shown in Fig. 1.

Figure 2:
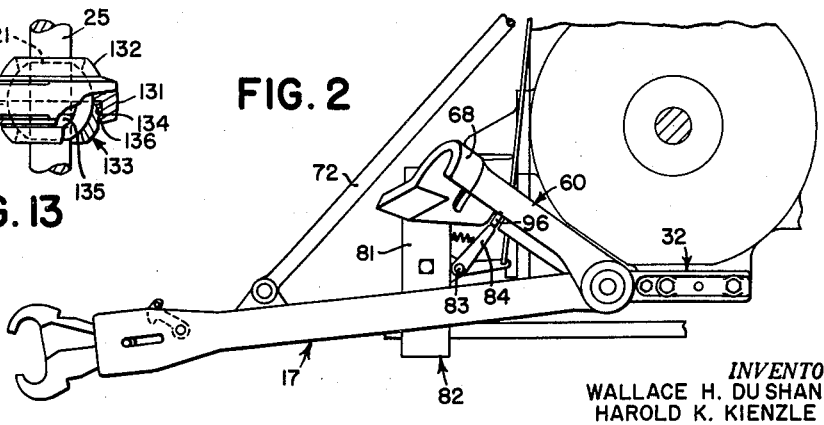
Fig. 2 is a fragmentary view somewhat similar to Fig. 1, showing the sway control mechanism held in its raised position, whereby lateral swinging of the hitch links and associated implement is permitted in the operating position of the implement.

Each of the sway control arms 60 is provided with a latch unit 90 that includes a rockable member 91 mounted in suitable apertured lugs 92 and 93 formed on the sway control arm 60, and the rockable member 91 carries a forward arm 96 that is adapted in one position of the latch 90 to project through an opening 97 formed in the laterally inner wall of the sway control arm 60, as best shown in Fig. 5. Rearwardly of the arm 96 the latch member 91 carries a link engaging detent 98 that, in the position of the latch member 91 shown in Figs. 7 and 8, is adapted to lie underneath the link 17 and hold the same in locked engagement with the link-receiving section 68 of the sway control arm 60, as best shown in Fig. 8. When the latch member 90 is rotated into the position shown in Figs. 5 and 6, the extension 96 is disposed laterally inwardly of the sway control arm 60 and in a position to engage the upper end of the latch arm 84 (Fig. 3) and hold the sway control arm 60 in an elevated position, even though the draft links 17 should be lowered. Fig. 2 also shows the sway control arm latched in its upper position. In moving upwardly from the position shown in Fig. 1 to the position shown in Figs. 2 and 3, with the arm 96 extending laterally inwardly, the latter rides up in front of the arm 84 (Figs. 1 and 2) and shifts the same rearwardly against the spring 88 until the arm 96 reaches a point just above the end of the arm 84, whereupon the latter then swings back into the position shown in Figs. 1 and 2, holding the sway control arm 60 in its raised position, as shown in Figs. 2 and 3.

Suitable means is provided for holding the latch unit 90 in either of its two optional positions. A U-shaped member 101 is mounted in a pair of openings formed in the adjacent wall portion 102 (Figs. 5 and 7). One end 103 of the member 101 extends in the path of movement of a notched sector 104 formed on or carried by the latch member 90. The other end 105 extends a substantial distance within the sway control arm 60 and carries a biasing spring 106 (Fig. 9) that bears against the inner face of the wall 102 at one end and at the other end against the washer 107 or the like held on the end 105. The sector 104 is provided with a pair of notches 108 and 109 (Figs. 6 and 8) and the short end 103 cooperates with these notches for holding the member 90 in either of its two positions. The member 90 may be changed from one position to another, merely by drawing the member 101 outwardly until the short end 103 clears the sector 104, and then manually turning the member 90 from one position to the other, as desired.

As mentioned above, when the latch members 90 of the sway control arm 60 are turned into the position indicated in Fig. 5, they are in a position to latch the sway control arms 60 in their upper position, in which they act to lock the draft links 17 against lateral swinging only in the raised or transport position. If, when the latch arms 96 are in the position shown in Fig. 5, the sway control arms 60 are in their lowered position, as shown in Fig. 1, as soon as the draft links 17 are raised, as by operation of the power lift, the sway control arms 60 will become locked or latched in their upper position so that subsequently the links 17 may be lowered and raised, as desired, but locked against lateral swinging only in their raised position, being free to swing laterally relative to the tractor when they become disengaged from the sway control arms 60 held, as stated, in their upper position. In some cases it may be desirable to lock the draft links 17 against lateral swinging in not only their upper or transport position but also in their lowered or operating position, and in that event all that is necessary for the operator to do is to turn the latch members 90 into the position shown in Fig. 7, in which case the arms 96 are turned away from the locking arms 84 and, in addition, the detent sections 98 are swung around under the draft links 17 so as to lock the latter and the sway control arms 60 together, whereby both move generally vertically as a unit when the draft links move, or are moved, generally vertically relative to the tractor. However, all lateral movement of the links 17 will be locked out by the sway control arms 60. In thus limiting or preventing lateral movement of the links 17, the sway control arms 60 secure additional inward or lateral support by virtue of their slidable bearing against the upwardly extending portions 81 of the drawbar support 82.

In operation, assuming that the parts are in the position shown in Fig. 2, in which the sway control arms 60 are held in their raised positions, the draft links 17 are free to sway laterally relative to the tractor so long as they are not raised into their transport position. To facilitate connecting the draft link 17 with an implement 12, as by backing the tractor into the implement, it is desirable to lock the draft links 17 against lateral displacement. All that is necessary to do is for the operator to pull up on the handle 87, and the sway control arms 60 will then swing downwardly and lock the links 17 against lateral shifting relative to the tractor.

In order to provide means cooperating with the sway control arm 60 during the time they function to hold the draft links 17 against lateral swinging while backing the tractor into the implement, it is desirable to have some form of automatically engageable connection between the links 17 and the implement. One preferred form of such connection is shown in Figs. 1 and 2 and, although not forming a part of the present invention except in combination with the particular sway control mechanism shown and described above, the automatically engageable means will now be described.

The rear end of each of the hitch or draft links 17 is provided with connector mechanism 110 that includes a pair of upper and lower hook members 111 and 112 hingedly connected together by a pivot pin 113 that slides in slots 114 formed in the rear end of the draft link 17, said rear end being hollow for the purpose of receiving the forward sections of the hook members 111 and 112. Suitable spring means act to hold the members 111 and 112 separated, as shown in Fig. 1, but the rear end of the link 17 is provided with shouldered sections 116 and 117 that cooperate with companion shouldered sections 118 and 119. A latch member 121 is carried by the draft link 17 and is adapted to engage shoulders 122 formed on both of the hook members 111 and 112, when the latter members are forced laterally inwardly of the associated draft link 17, as shown in Fig. 3. Thus, with the sway control arms 60 holding the link 17 against lateral displacement, as shown in Fig. 1, the tractor and links may be backed into the implement 12, with the connectors 14 passing in between the hook ends of the members 111 and 112 and forcing the latter inwardly of the link 17 until the latch 121 engages over the shoulders 122, which thus locks the draft links 17 in engaged relation with the implement 12. The rear end of the upper link 18 is adapted to be connected in any suitable way with the upper portion 19 of the implement frame 13. For example, some form of quick attachable connection, such as the one just described, may be provided, if desired.

In some cases the implement itself may be equipped with some form of quick attachable connection, in which case the connector mechanisms 110 may be eliminated and the draft links 17a (Figures 11 and 12) provided with apertures that receive studs 144 on the ends of a crossbar 145 that, in effect, forms a part of the hitch structure, the draft links 17a carrying ball connectors 146 detachably connected with the studs 144. The central portion of the bar 145 carries a guiding element 147 adapted to enter a guiding notch 148 in upper and lower plates 149 that form a part of an associated implement, indicated fragmentarily at 150, that also includes latch means (not shown) arranged to detachably lock the bar 145 to the implement.

Another detachable connection that may be used between the implement and draft links is shown in Figure 14. Here the implement, shown at 12a, carries a transverse bar 15a to the ends of which pointed members 155 are fixed so as to extend forwardly. The rear ends of the draft links 17b are formed with sockets 156 in which the pointed members 155 are received when the tractor is backed into the implement. Detents 157 carried by the links 17b engage shoulders 158 on the members 155 when the latter seat in the sockets 156 to releasably lock the members 155 therein.

Referring to Fig. 4, the forward end of the link 17 is shown as incorporating two sections 22a and 22b disposed about the ball member 21. If desired, instead of the construction shown in Fig. 4, the construction shown in Fig. 13 may be adopted. Referring now to Fig. 13, the draft link 17a is shown as having a forward end 131 formed as a forging or the like with one side shaped, as at 132, generally spherically so as to enclose the adjacent portion of the ball connector 21 disposed on the shaft 25. The other spherical section, indicated at 133, is formed as a separate part disposed within a socket 134 formed in the link end 131. The member 133 is formed with a groove 135 on the exterior surface into which a lip portion 136 on the end 131 may be forced, as by a swaging operation. It will be understood that, in both forms of the invention, the ball connector 21 is freely movable within the spherical socket formed by the parts 22a and 22b, and the parts 132 and 133.

While we have shown and described above the preferred structure in which the principles of the present invention have been incorporated, it is to be understood that the present invention is not to be limited to the particular details shown and described above, but that, in fact, widely different means may be employed in the practice of the broader aspects of our invention.

What we claim, therefore, and desire to secure by Letters Patent is:

1. In a tractor, a mobile body, a pair of laterally spaced apart generally fore-and-aft extending draft links disposed at the rear of the tractor body and swingable relative to the latter about a transverse axis, a transverse part on the tractor adapted to receive the forward end of each link in either of two laterally spaced apart positions thereon, sway control means connected with the tractor so as to be swingable with said links about said axis and having rear link-engaging sections held against lateral displacement relative to the tractor, and selectively disposable means acting between each of said transverse parts and the forward ends of said links to hold the forward ends of said links against lateral movement out of either of said positions when said links are raised and lowered relative to the tractor, thereby retaining the adjusted spacing between the rear ends of said links when the latter are engaged by said sway control means and the links are raised and lowered.

2. In a tractor, a mobile body, a pair of laterally spaced apart fore-and-aft extending draft links, sway control means carried by the tractor and engageable with each of said links between the ends thereof for limiting lateral movement thereof, means at the rear ends of said links adapted to receive a pair of laterally spaced apart implement connecting means, a transverse part on the tractor body at each side thereof adapted to receive said draft links with the front end of each of said links disposed in either of two different positions, depending on the spacing between said implement connecting means, a pair of blocks, one disposable on each of said parts and each block being disposable on the associated part in either of two positions for selectively holding the associated link in either of its positions.

3. In a tractor, a mobile body, a pair of laterally spaced apart draft links, each having a forward apertured end the sides of which have laterally outwardly projecting sections, a transverse part at each side of the tractor body adapted to shiftably receive the forward apertured end of the associated draft link, abutment means releasably mounted on each of said transverse parts and disposable on one side or the other of the apertured end of the associated draft link for holding the latter close to the tractor body or a distance away from the latter, said abutment means including socket means to receive at least one of said laterally projecting sections in either position of said abutment means and means on the tractor body to hold said abutment means in different positions.

4. In a tractor, a mobile body, means serving as bar ends projecting laterally outwardly from the tractor body at each side thereof, a pair of laterally spaced apart draft links, each having an apertured forward end adapted to be shiftably mounted on said bar ends, each of said link ends being generally spherical exteriorly, and a part disposable on each bar end in either of a plurality of positions and having a generally spherical socket engageable with the adjacent generally spherical exterior portion of the associated draft link for optionally holding the forward end of the associated draft link in different positions.

5. In a tractor, a mobile body, a pair of generally laterally spaced apart draft links, means pivotally connecting the forward end of each of said links to the tractor at either of two laterally spaced apart points, and a sway control arm pivoted at each side of the tractor adjacent the draft link at that side of the tractor and having a portion adapted to engage the associated draft link in either position of the front end thereof relative to the tractor and to hold the draft link against lateral movement relative to the tractor in either direction, whereby the rear ends of said draft links are spaced apart different distances, depending on the points of connection of the front ends thereof with the tractor.

6. In a tractor, a mobile body, a pair of generally laterally spaced apart draft links, means connecting the forward ends of said links to the tractor whereby said links are swingable both laterally and vertically relative to the tractor, a pair of sway control arms hingedly connected with the tractor, one at each side thereof, and swingable generally vertically relative to the tractor about a transverse axis into and out of contact with said links, each of said sway control arms being laterally rigid and having a portion engageable, when the arms are lowered, with the associated draft link to hold the latter against lateral movement relative to the tractor, and optionally operable means connectible with said sway control arms to hold them out of engagement with said links when in their lowered position, whereby the draft links are freely swingable laterally, raising the draft links disposing them in a position engaging said control arms so as to prevent lateral movement of the draft links when the latter are raised.

7. In a tractor, a mobile body, a pair of generally laterally spaced apart draft links, means connecting the forward ends of said links to the tractor for swinging movement both laterally and vertically relative to the tractor, a pair of sway control arms, means hingedly connecting said sway control arms with the tractor for generally vertical movement relative to the tractor into and out of engagement with said draft links, and portions carried by the tractor and engageable with said sway control arms to provide lateral support for the latter and cooperate therewith to hold said draft links against lateral swinging with respect to the tractor.

8. In a tractor, a mobile body, a pair of draft links connected with the tractor body at laterally spaced apart points and swingable vertically relative to the tractor between predetermined upper and lower positions and also laterally relative to the tractor, a pair of sway control arms hingedly connected with the tractor to swing vertically with said draft links and having link-receiving means to engage said links and prevent lateral movement of said links, releasable means on the tractor body to optionally retain said control arms in an upper position to engage said links only in the upper position of said links, and optionally operable means carried by said arms to lock the latter to said links so as to hold the latter against lateral movement in positions between said upper and lower positions.

9. In a tractor, a mobile body, a pair of draft links connected with the tractor body at laterally spaced apart pointss and swingable both vertically and laterally relative to the tractor, a pair of sway control arms hingedly connected with the tractor to swing vertically relative to the tractor, latch means carried by the tractor in a position to engage the sway control arms and hold them in an upper position, means on said sway control arms to receive said links in laterally restrained relation when the links are raised into engagement with said arms, means on said arms to releasably lock the arms to said links to move generally vertically therewith, means to disengage said latch means from said arms so as to provide for movement of the arms generally vertically with said links, whereby the latter are held against lateral movement in both upper and lower positions relative to the tractor, and means to release the links from said control arms, whereby said link may move downwardly away from said control arms and then freely laterally.

10. In a tractor, a transverse link-receiving pivot means extending outwardly from the tractor body, an arm having a pair of laterally spaced apart portions pivotally connected with laterally inner and outer portions, respectively, of said pivot means, a draft link having an apertured portion pivotally connected with said pivot means and disposed and shiftable laterally between said laterally spaced apart portions, said arm and link being disposed in abutting relation at a point spaced from said pivot means, whereby shifting the inner end of said draft links acts to swing the outer end of said draft link laterally, and means engageable with said pivot means to hold the draft link in selected positions between said laterally spaced apart portions.

11. In a tractor, a transverse link-receiving pivot means extending outwardly from the tractor body, a sway control arm having a pair of laterally spaced apart portions pivotally connected with laterally inner and outer portions, respectively, of said pivot means, whereby said arm is held against movement in a generally lateral direction, a draft link having an apertured portion adjacent one end pivotally connected with said pivot means and disposed and shiftable laterally between said laterally spaced apart portions, said sway control arm being disposable adjacent said draft link and having a link-engaging section adapted to engage the link at a distance from said pivot means, whereby said link moves generally laterally about said link-engaging section as a center when the apertured link portion is shifted laterally relative to said pivot means to dispose the other end of said link in a different position laterally of the tractor.

12. In a tractor, a draft link pivoted to the tractor body for movement relative thereto about a transverse axis, a sway control arm pivoted to the tractor for movement about said axis and having, spaced from said axis, a portion overlying said link and provided with a downwardly facing link-receiving socket section adapted to engage said link, when the latter is raised into contact with said arm or the arm lowered into engagement with said link, so as to limit lateral movement of said link relative to the tractor, and latch means on said arm adapted to be moved into and out of a position on the under side of said link for releasably locking said link and arm together, said latch means when moved out from a position underneath said link accommodating movement of the latter into and out of sway-preventing engagement with said arm.

13. A sway control arm comprising a generally rearwardly extending member hingedly connected at its front end with the tractor for generally vertical swinging movement relative to the tractor about a generally transverse axis, a link-engaging section at the rear end of said arm, a latch member movably carried by said arm and having a link-engaging portion and a tractor-engaging portion, one portion being disposed in an inoperative position when the latch member is moved into a position disposing the other portion in an operative position.

14. In a tractor and implement combination, wherein the implement has a pair of link-receiving studs, a pair of draft links connected at their forward ends with the tractor for generally vertical and lateral swinging movement, a pair of sway control arms hingedly connected with the tractor and adapted, in one position, to engage said links and hold them in an implement-engaging position before an implement is connected with said links, stud-engaging means movably carried by the rear ends of said links, and means operative by a forward movement of said stud-engaging means relative to the links, as when the tractor is backed into the implement with the sway control arms holding the links against lateral swinging, to lock the stud-engaging means in implement holding position.

15. The invention set forth in claim 14, further characterized by said stud-engaging means comprising a pair of hinged parts biased for separating movement and mounted for telescopic movement into and out of the associated draft link, and said locking means comprising a part on the associated link releasably engageable with said stud-engaging parts when the latter are forced into a position within the associated link.

16. In a tractor, a mobile body, a pair of generally laterally spaced apart draft links, means pivotally connecting the forward end of said links to the tractor, a sway control arm pivoted at each side of the tractor and having a portion adapted to engage the associated draft link and hold the draft link against lateral movement relative to the tractor, and latch means including a pair of pivoted arms carried by the tractor and releasably engageable with said control arms to hold them in an upper position out of engagement with said links.

17. The invention set forth in claim 16, further characterized by each of said control arms having a flaring guide portion coacting with said link to guide them into engaged position with said control arms when said pivoted latch arms are moved into a released position.

18. The invention set forth in claim 16, further characterized by a shaft mounted on the tractor and carrying said latch arms, and means providing abutments on said sway control arms to engage said latch arms.

19. The invention set forth in claim 18, further characterized by means resiliently holding said latch arms in abutment-engaging position.

References Cited in the file of this patent

UNITED STATES PATENTS

| | | | |
|---|---|---|---|
| 1,417,207 | Schutt | May 23, | 1922 |
| 1,491,637 | Schrum | Sept. 22, | 1924 |
| 2,640,708 | Fraga | June 2, | 1953 |
| 2,692,148 | Bywater | Oct. 19, | 1954 |
| 2,698,564 | Sawyer | Jan. 4, | 1955 |
| 2,726,589 | Todd | Dec. 13, | 1955 |
| 2,731,898 | Frevik et al. | Jan. 24, | 1956 |
| 2,841,427 | Sheppard | July 1, | 1958 |

FOREIGN PATENTS

| | | | |
|---|---|---|---|
| 529,939 | Germany | July 18, | 1931 |